(12) United States Patent
Wang et al.

(10) Patent No.: US 7,761,263 B2
(45) Date of Patent: Jul. 20, 2010

(54) CASTING DESIGN OPTIMIZATION SYSTEM (CDOS) FOR SHAPE CASTINGS

(75) Inventors: Qigui Wang, Rochester Hills, MI (US); Peggy E. Jones, Saginaw, MI (US); Mark A. Osborne, Midland, MI (US); Wenying Yang, Windsor (CA)

(73) Assignee: GM Global Technology Operations, Inc., Detroit, MI (US)

( * ) Notice: Subject to any disclaimer, the term of this patent is extended or adjusted under 35 U.S.C. 154(b) by 985 days.

(21) Appl. No.: 11/142,546

(22) Filed: Jun. 1, 2005

(65) Prior Publication Data
US 2006/0277004 A1 Dec. 7, 2006

(51) Int. Cl.
*G06F 17/50* (2006.01)
(52) U.S. Cl. .............................. 703/1; 703/6
(58) Field of Classification Search .................. 703/1, 703/6; 700/97, 103, 104, 145, 146; 706/50; 715/694
See application file for complete search history.

(56) References Cited

U.S. PATENT DOCUMENTS

| 5,951,164 | A | 9/1999 | Valentin | |
| 6,269,321 | B1 | 7/2001 | Palle et al. | |
| 6,298,898 | B1* | 10/2001 | Mahadeva et al. | 164/4.1 |
| 6,454,459 | B1 | 9/2002 | Sillen et al. | |
| 6,863,114 | B2 | 3/2005 | Sillen | |
| 2002/0152715 | A1* | 10/2002 | Rotheroe | 52/731.2 |
| 2004/0024480 | A1 | 2/2004 | Iimi et al. | |
| 2004/0064211 | A1* | 4/2004 | Mateau et al. | 700/97 |
| 2005/0055181 | A1 | 3/2005 | Verdura et al. | |

FOREIGN PATENT DOCUMENTS

WO 0221345 A1 3/2002

OTHER PUBLICATIONS http://www.novacast.se/ftprod.htm (1 of 3) Mar. 17, 2005 5:11:50 AM (22 pp.).

* cited by examiner

*Primary Examiner*—Dwin M Craig

(57) ABSTRACT

A casting design system (101) is provided which comprises (a) a database (115) which contains casting design data and rules, (b) a user interface (109), in communication with the database, which accepts as input a product design (103) that is to be cast by a casting process, and (c) an inference engine (111) which is adapted to generate casting designs (114) from the input product design by searching the database and retrieving data therefrom.

28 Claims, 13 Drawing Sheets

FIG. 8

| Sample Editor : Form | | | | | | | |
|---|---|---|---|---|---|---|---|
| Example Knowledge Base Editor | | | | | | | Exit |

Process Relationships
Material Properties
Pattern / Trends
Design Related
Others Others
Others Others
Others Others Selection Window
Mechanical Properties
Chemistry & Characteristics
Others 1
Others 2
Others 3
Others 4

Drop Filter Fields Here

Type -
Sand Casting

| AA Num | Temper | Ultimate Tensile | Yield Strength | Elongation | Compressive | Brinell Hardness | Shearing |
|---|---|---|---|---|---|---|---|
| 201.0 | T7 | 60 | 50 | 3 | | 110-140 | |
| 242.0 | 0.00 | 23 | 18 | 1 | 18 | 55-85 | |
| | T571 | 29 | | 0.5 | 34 | 70-100 | |
| | T61 | 32 | 20 | | | 90-120 | |
| | T77 | 24 | 13 | 1 | 24 | 60-90 | |
| 295.0 | T4 | 29 | 13 | 6 | 17 | 45-75 | |
| | T6 | 32 | 20 | 3 | 25 | 60-90 | |
| | T62 | 36 | 28 | 2 | 34 | 80-110 | |
| | T7 | 29 | 16 | 3 | | 55-85 | |
| 319.0 | F | 23 | 13 | 1.5 | 19 | 55-85 | |
| | T5 | 25 | | 1.5 | 27 | 65-95 | |
| | T6 | 31 | 20 | 1.5 | 25 | 65-95 | |
| 355.0 | T51 | 25 | 18 | 1.5 | 24 | 50-80 | |
| | T6 | 32 | 20 | 2 | 26 | 70-105 | |
| | T7 | 35 | 26 | 0.5 | 38 | 70-100 | |
| | T71 | 30 | 22 | 1.5 | 30 | 60-95 | |
| 356.0 | F | 19 | | 2 | | 40-70 | |
| | T51 | 23 | 16 | 2 | 21 | 45-75 | |
| | T6 | 30 | 20 | 3 | 25 | 55-90 | |
| | T7 | 31 | 29 | 2 | 31 | 60-90 | |
| | T71 | 25 | 18 | 3 | 22 | 45-75 | |
| 443.0 | | | | | | | |
| 512.0 | | | | | | | |

FIG. 9

CASTING DESIGN OPTIMIZATION SYSTEM (CDOS) FOR SHAPE CASTINGS

FIELD OF THE DISCLOSURE

The present disclosure relates generally to the field of casting, and more particularly, to a system for optimizing shape casting designs.

BACKGROUND OF THE DISCLOSURE

With the development of computational methodologies and, in particular, the rapid advance of microcomputers over the past decade, mathematical modeling and numerical simulation of various metallurgical casting processes has become increasingly popular in the metal casting industry. This has resulted in the development of software that can be used to predict and visualize the heat transfer and fluid flow events that are integral to the casting process.

However, despite the existence of such software, the interpretation of computed results still relies heavily on the expertise of casting specialists. Even with the colorful visualization of the predicted results of heat transfer and fluid flow events occurring during casting with a sophisticated user interface, it is almost impossible to systematically optimize the design of castings without the help of human interaction and numerous manual trial-and-error iterations.

Consequently, at present, product, casting, and gating system designs are still based on individual experience and on trial-and-error iterations. The aforementioned process simulation tools are not fully utilized in the initial product design process, but instead are most commonly used for troubleshooting in the prototype and foundry trial phases of the casting development after the product, casting and gating system have been designed and the alloy and casting process have been selected. Moreover, there is no computational optimization technique involved in conventional casting design processes. This results in long casting development cycles and low reliability of the casting design process, due to the variation of individual knowledge and experience.

There is thus a need in the art for systems and methodologies which overcome the aforementioned problems. In particular, there is a need in the art for systems and methodologies that allow casting product designers and casting process engineers to optimize the design of casting geometries and gating/riser systems, as well as casting procedures, to ensure high quality castings with minimum lead time and cost. These and other needs are met by the devices and methodologies described herein.

SUMMARY OF THE DISCLOSURE

In one aspect, a casting design system is provided which comprises (a) a database which contains casting design data and rules, (b) a user interface, in communication with said database, which accepts as input a product design that is to be cast by a casting process, and (c) an inference engine which is adapted to generate casting designs from the input product design by searching the database and retrieving data therefrom.

In another aspect, a casting design optimization system is provided which comprises (a) a knowledge database which contains casting design data and rules, (b) a graphical user interface, in communication with said knowledge database, which accepts as input a product design that is to be cast by a casting process, (c) a geometry analyzer, in communication with said graphical user interface, which analyzes the input product design and generates the geometry characteristics of the product to be cast, (d) an inference engine which is adapted to generate casting designs by (i) searching the knowledge database, (ii) performing pattern-matching operations, and (iii) implementing logical processes, (e) a process simulation module which designs and runs process simulations on the casting designs generated by the inference engine, and (f) an optimization module that optimizes the casting designs generated by the inference engine.

In still another aspect, a method for optimizing casting designs is provided which comprises (a) providing a proposed casting design for optimization; (b) providing a database which contains information relating to casting, the database including design rules, alloy properties, and information relating to known casting methods; and (c) analyzing the geometry of the proposed casting design with the use of the information contained in the database, thereby deriving a possible casting solution.

These and other aspects of the present disclosure are described in greater detail below.

BRIEF DESCRIPTION OF THE DRAWINGS

FIG. 8 is a screen shot depicting an example of the data contained in the knowledge database in the CDOS system disclosed herein;

FIG. 9 is a screen shot depicting the knowledge database editor in the CDOS system disclosed herein;

DETAILED DESCRIPTION

Casting Design Optimization Systems (CDOS) and methodologies are provided herein which overcome the aforementioned infirmities in the art. These systems and methodologies allow casting product designers and casting process engineers to optimize the design of casting geometries and gating/riser systems, as well as casting procedures, to ensure high quality castings with minimum lead time and cost. As a result, significant energy and cost savings are realized by reducing scrap and increasing yield, and by improving the mechanical properties and durability of cast components. This results in a wider use of shape castings in critical structural applications that require high strength and fatigue resistance.

Moreover, since the design of the gating/riser system is optimized along with the remainder of the casting design, the process described herein results in optimization of the total casting design. By contrast, in some existing design analysis systems, the gating/riser system is selected from the literature after the remainder of the casting design has been completed, with the result that the effect of the gating/riser system on the remainder of the casting design is ignored.

Figure 1:
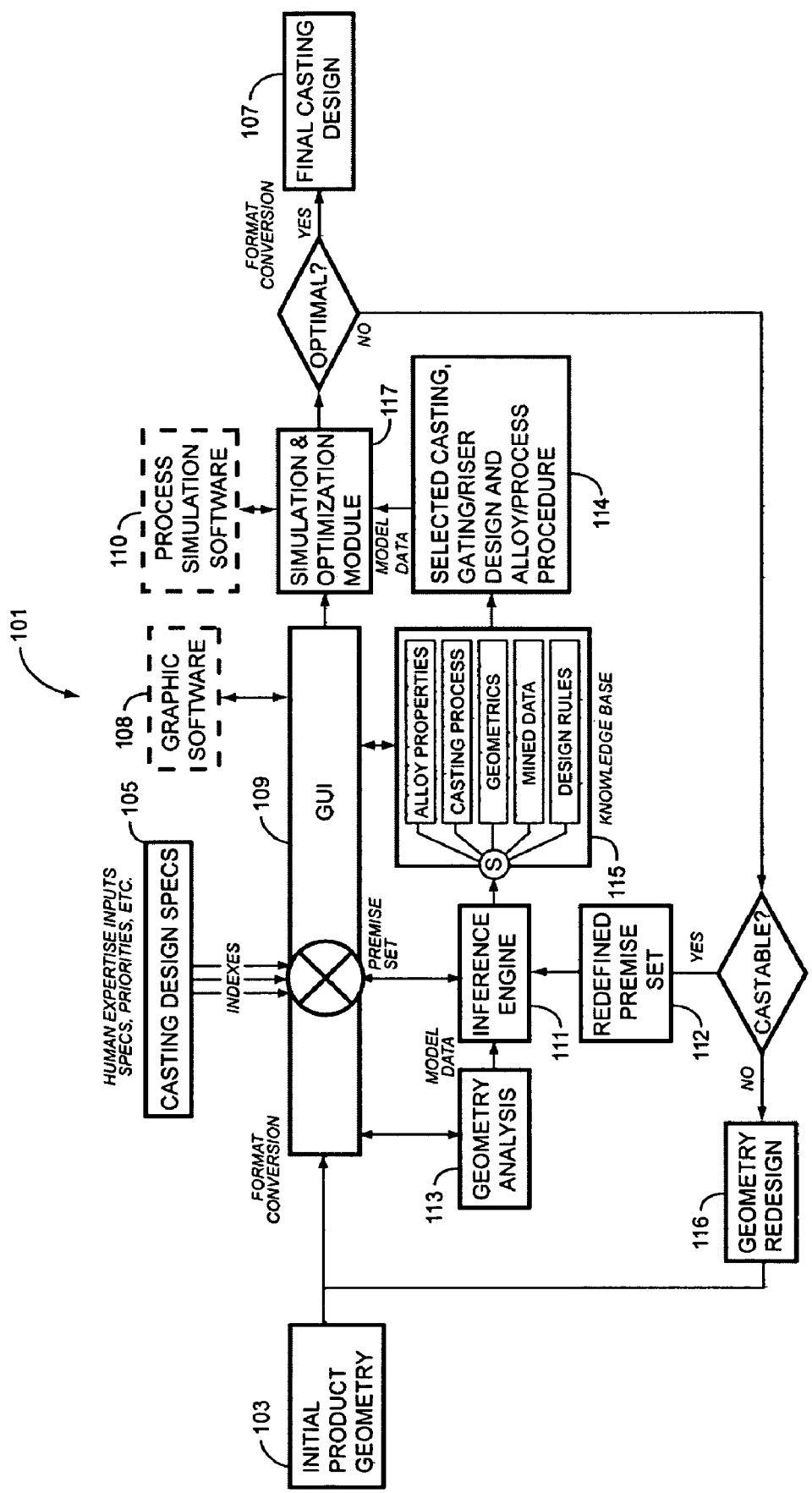
FIG. 1 is a schematic illustration of the architecture of the Casting Design Optimization System (CDOS) disclosed herein.

FIG. 1 illustrates a first, non-limiting embodiment of a CDOS system made in accordance with the teachings herein. The CDOS system 101 depicted in FIG. 1 is adapted to generate final casting designs 107 that have maximum castability, maximum yield, and minimum casting defects and cost. It achieves this result through an optimal gating/riser/runner (these elements may be referred to collectively as the "rigging") and casting and process design which is described in detail below.

The CDOS system 101 accepts as input an initial product geometry 103, which is typically a proposed or estimated geometry for a part to be cast. This initial product geometry may be generated by a variety of commercially available CAD software programs, including, but not limited to, AUTOCAD® or UNIGRAPHICS® CAD software programs, and is input into the CDOS system 101 as an electronic file. If necessary, the format of the file containing the initial product geometry 103 may be converted into a format that is acceptable to the CDOS system 101. The CDOS system 101 also accepts casting design specifications 105 as input information. The casting design specifications 105 may include, but are not limited to, information such as product specifications, priorities, inputs based on human expertise, the quantity of parts to be produced, desired quality characteristics, mechanical properties in the resulting part, foundry capabilities, and other information which will affect the selection of the casting method and the design to be used. This information may be sorted by the GUI 109 and passed to the inference engine 111, where it is used as criteria for searching the knowledge database.

As discussed below, the CDOS system 101 operates on the initial product geometry 103 to produce a final casting design 107 that has been optimized. The output of the CDOS system 101 includes the final casting geometry, and also typically includes optimal selection and design of the associated gating/riser/runner or rigging system as well as the casting process parameters required to fabricate the product. In the event that some portions of the initial product geometry are not optimal or cannot be cast, the CDOS system 101 will typically be adapted to inform the user of this fact, and may further be adapted to issue a casting geometry optimization failure report, which will detail the reasons why the geometry could not be optimized (e.g., no known casting process is suitable for producing the proposed geometry). The system can also provide castable solutions and recommendations for the change of the initial product geometry.

As seen in FIG. 1, the CDOS system 101 comprises a Graphical User Interface (GUI) 109 platform that facilitates interaction between the CDOS system 101, the user, and any external programs that the CDOS system 101 interacts with. The GUI 109 may optionally interface with external graphic software 108, or else suitable graphic capabilities may be built into the GUI 109. The GUI 109 is in communication with an inference engine 111 that executes overall searching, pattern-matching, and reasoning processes, and is also in communication with a geometry analysis module 113 that performs an analysis on the geometry of the product to be cast 103.

The GUI 109 is further in communication with a knowledge database 115 that contains existing information relating to casting processes and stores casting design knowledge and rules, and is also in communication with a process simulation and optimization module 117 that designs and conducts modeling experiments on the proposed casting and gating/riser geometries. The process simulation and optimization module 117 may optionally interface with suitable external process simulation software 110 to allow it, for example, to run processing simulations on proposed casting and gating/riser geometries, or else the process simulation and optimization module 117 may have this capability built in. The process simulation and optimization module 117 also interfaces with a selected casting, gating/riser design and alloy/process procedure module 114 which selects these parameters with input from the knowledge database 115.

In the optimal design process, the geometry analysis module 113 of the CDOS system 101 first reads and analyzes the part geometry to develop key geometry characteristics, including, but not limited to, such characteristics as maximum surface area, volume, modulus, maximum cross section location, minimum hole diameters, dimensional tolerance, surface finish, minimum wall thickness, maximum weight, central gravity point, and other such characteristics. This information is then passed to the inference engine 111. Based on the characteristics of part geometry and the casting design specifications (such as, for example, performance requirements, quality requirements, production quantity, production cost, foundry capability, and other such specifications), the inference engine 111 then applies the design rules and expert knowledge in the knowledge database 115 to complete the initial casting, and gating/riser designs. With the aid of computer process modeling (such modeling includes, but is not limited to, modeling of mold filling and solidification, and stress analysis and optimization techniques), the CDOS system 101 further optimizes the casting design. The knowledge and lessons learned during the design process are then incorporated into the updated knowledge database 115 for further use.

When the design has been optimized, the CDOS system 101 outputs the final casting design 107. If the design has not been optimized because it is not castable, the design is passed to a geometry redesign module 116. The geometry redesign module 116 may be adapted to suggest an alternative design based on the initial part geometry and specifications, and to pass the alternative design (or alterations to the initial part geometry) to the GUI 109 for a further iteration of the process. If the design has not been optimized but is castable; the premise set may be redefined, and the redefined premise set 112 is passed to the inference engine 111.

The key development steps for the production of a CDOS system 101 of the type described herein and the use of that system in optimizing casting designs are as follows:

(a) develop a text and graphic based database for the design of the casting and gating system;

(b) develop an inference/searching engine using either an artificial neural network or chaining techniques;

(c) develop a GUI (graphic user interface) and link it to the graphic package, casting process simulation tools, and optimization software;

(d) develop a geometry analysis module that can recognize and analyze part geometry;

(e) develop a simulation and optimization module that can design and execute the casting process simulation through the developed GUI; and (f) optimize the casting design using the optimization module.

As previously noted, the CDOS system 101 described herein may be adapted to interface with, and accept files and data generated by, other existing graphic design software. Such data and files include, but are not limited to, data and files generated by UNIGRAPHICS® or AUTOCAD® software programs. The CDOS system described herein may also be adapted to utilize commercial casting process simulation tools including, but not limited to, MAGMASOFT® and FLOW-3D® simulation tools, as well as optimization packages to perform the optimal casting and gating designs.

While the inference engine 111, knowledge database 115, geometry analyzer, and simulation/optimization module make up the core of the CDOS system 101, the GUI 109 is also an important component. The GUI not only provides a platform for the users to access the various functions of the software and to display a variety of information, but may also act as a bridge linking the CDOS system 101 with other process simulation and optimization software. The GUI 109 of the CDOS system 101 is designed for ease and convenience of use and operation.

Figure 2:
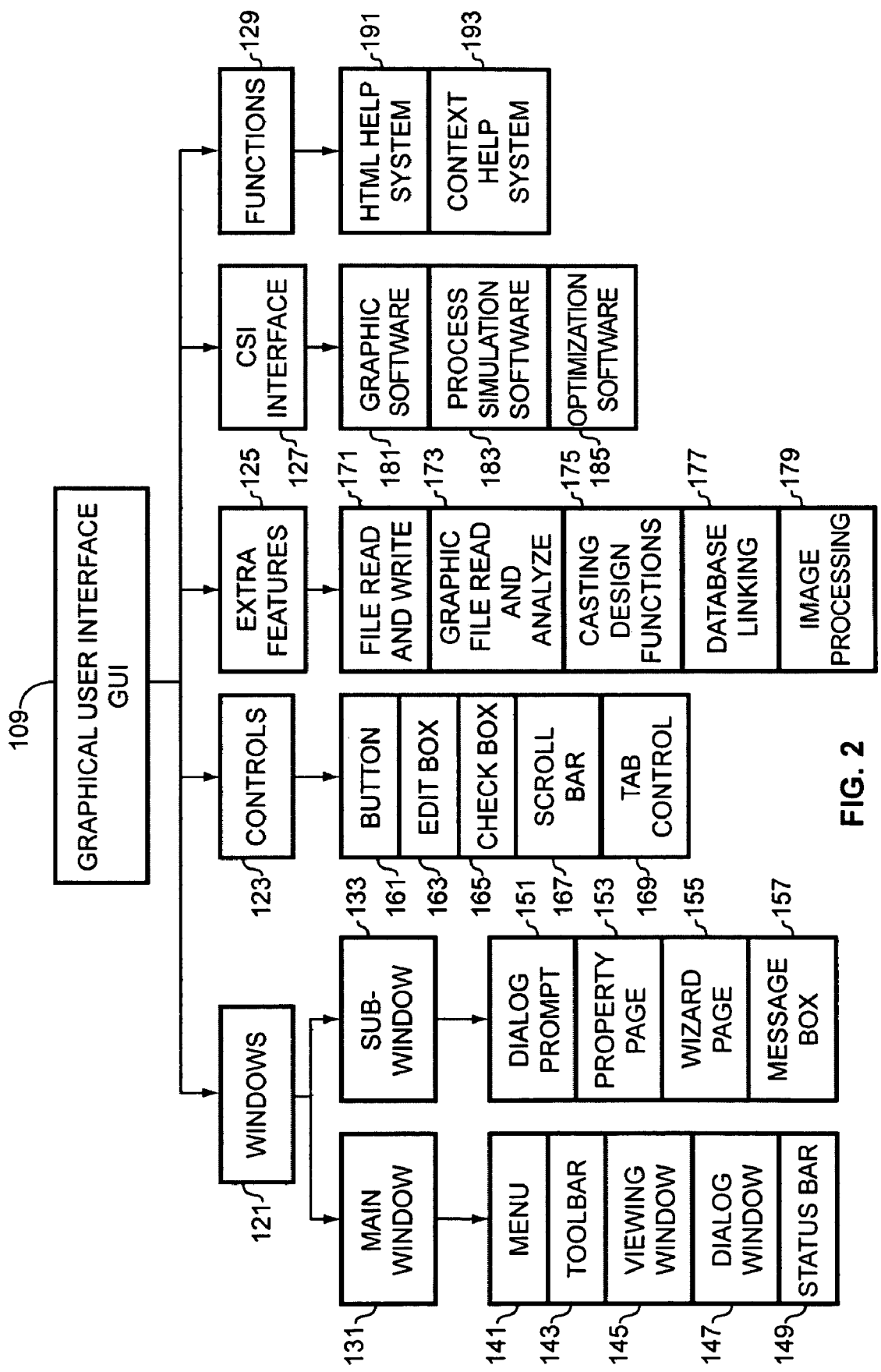
FIG. 2 is a flowchart illustrating the functionality of the Graphical User Interface (GUI) disclosed herein.

FIG. 2 shows the basic structure of the GUI 109. The GUI 109 integrates many elements. Its layout and functions are designed to be familiar to the average user and easy to utilize. In the particular configuration depicted, the GUI 109 is equipped with a windows module 121, a controls module 123, an extra features module 125, a commercial software interface (CSI) module 127, and a functions module 129.

The windows module 121 is divided into a main window 131 and sub-window 133 portion. The main window portion 131 controls the layout and content of the menus 141, the toolbars 143, the viewing windows 145, the dialog windows 147, and the status bars 149. The sub-window portion 133 controls the layout and content of the dialog prompts 151, the property page 153, the wizard page 155 (this page provides information and instructions regarding the use of the program and its features), and the message boxes 157.

The controls module 123 provides the standard control features found in a typical windows-based environment. These include control buttons 161, edit boxes 163, check boxes 165, scroll bars 167 and tab controls 169.

The extra features module 125 contains some of the features particular to the CDOS system 101. This includes file read and write functionalities 171, graphic file read and analyze functionalities 173, casting design functions 175, database linking 177, and image processing 179.

The CSI interface 127 provides access to other software that may interface with the CDOS system 101. This software may include, but is not limited to, the UNIGRAPHICS® and AUTOCAD® graphic software packages 181 noted above, as well as process simulation software 183 and optimization software 185.

The functions module 129 provides access to functions such as software support. In the particular embodiment depicted, the support is provided as both an HTML help system 191 and a context help system 193.

Figure 3:
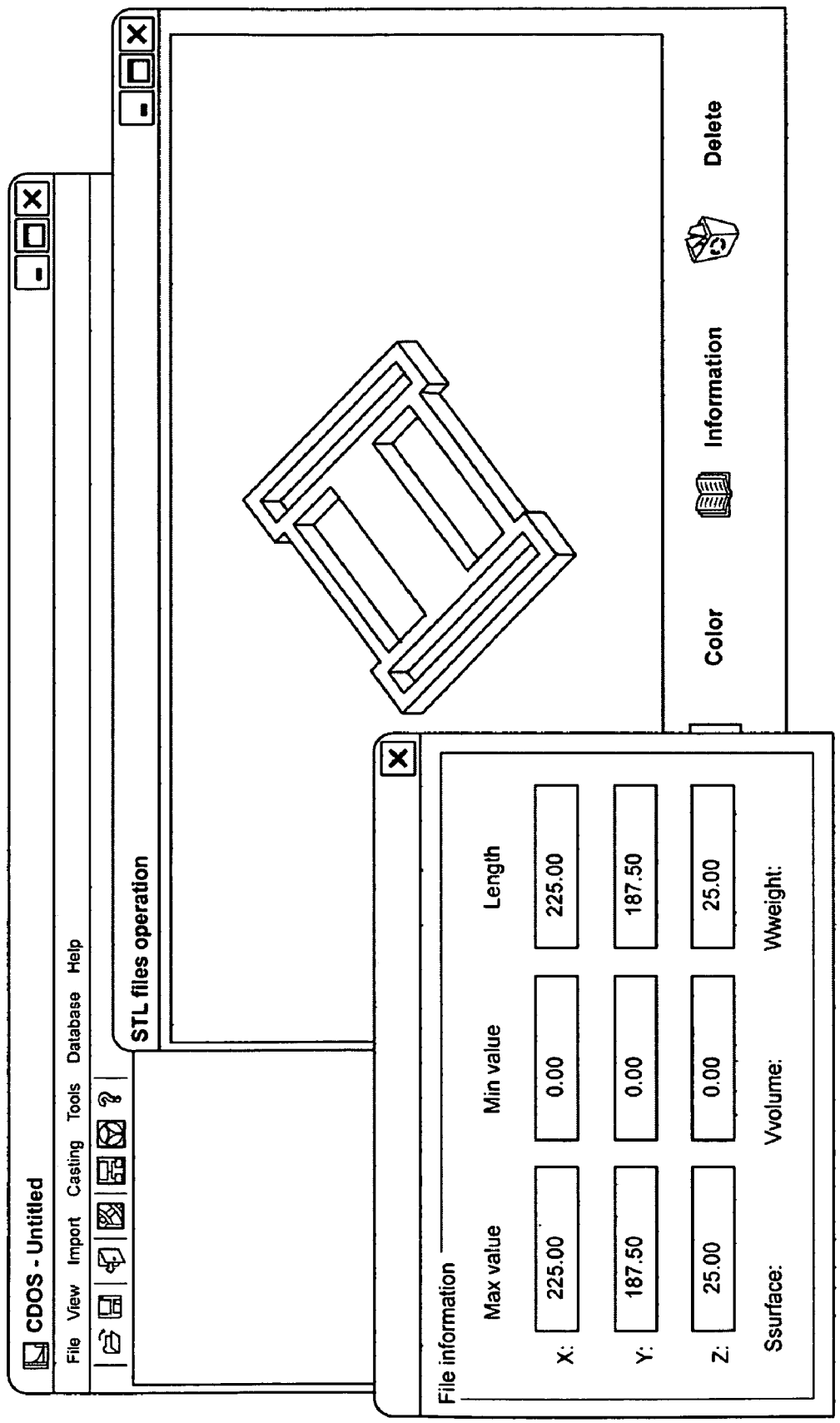
FIG. 3 is a schematic illustration depicting the rendering within the GUI of a 3-D model imported from a stereolithography (STL) file in the CDOS system disclosed herein.
Figure 4:
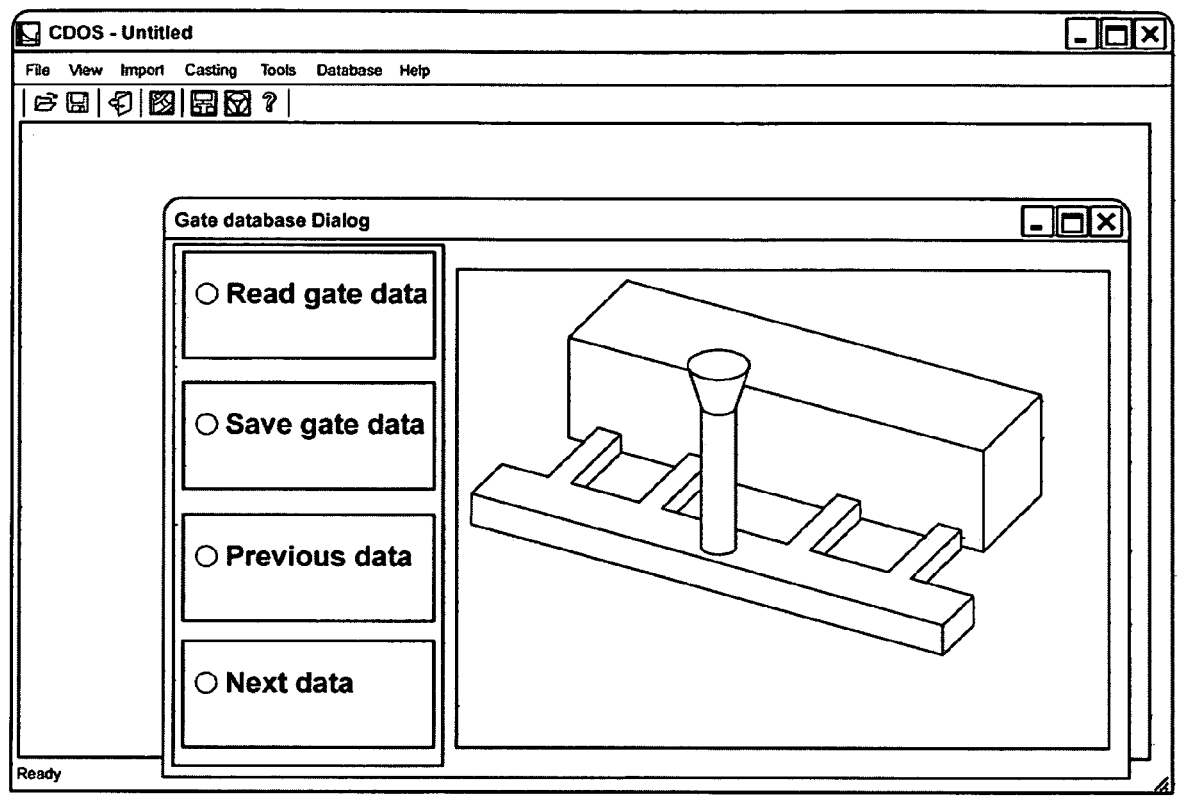
FIG. 4 is a schematic illustration of a gating configuration retrieved from the graphic knowledge database within the CDOS GUI disclosed herein.

Representative screen shots from one embodiment of the GUI 109 (see FIG. 1) are depicted in FIGS. 3 and 4. As shown in FIG. 3, the GUI 109 will typically be adapted to read graphic files and to conduct geometric analyses. In the particular embodiment depicted, the GUI 109 is shown creating a 3-dimensional rendering from a graphic file and relating some dimensional information which the CDOS system 101 derived from the file. As shown in FIG. 4, the GUI 109 is also typically adapted to allow the user to view various designs of representative gating systems that are included in the database of the CDOS system 101.

Figure 5:
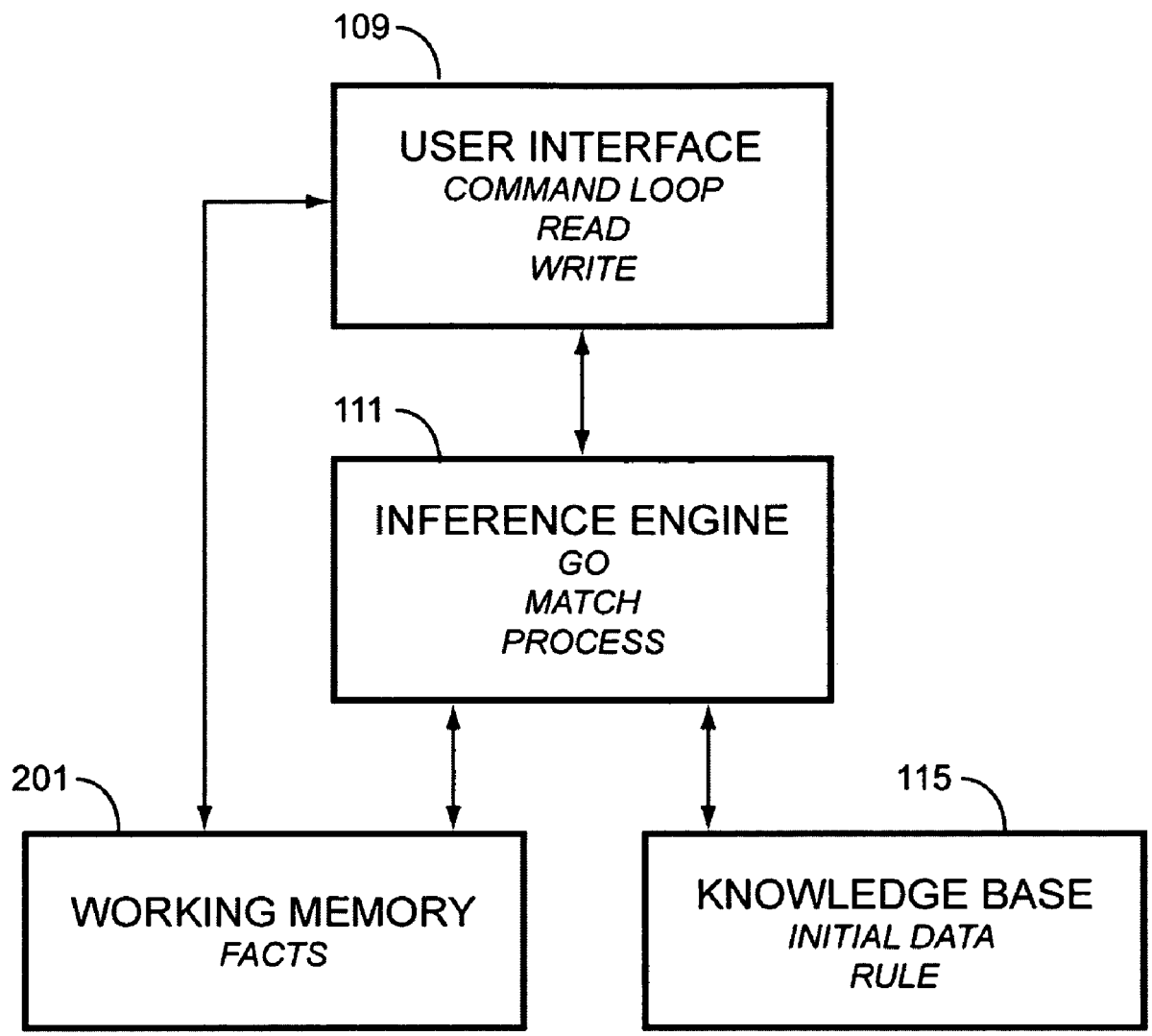
FIG. 5 is an illustration of the control structure of the inference engine system in the CDOS system disclosed herein.

FIG. 5 illustrates the control structure of the inference engine 111 and its operational relationship with the other components of the CDOS system 101. The inference engine 111 communicates with the knowledge database 115 and with a working memory 201, the later of which is also in communication with the GUI 109. In the particular embodiment depicted, the inference engine 111 is designed to implement a forward chaining algorithm. The forward chaining algorithm is data driven in that it starts from available information, adds new assertions along the way, and then tries to draw conclusions from them. This technique is most commonly used among rule-based systems. As there are many search parameters involved, this search-matching approach avoids the occurrence of combinatorial explosion inherent in brute force or resource-intensive searching, and hence functions in a more efficient manner. The search process itself is directed by a rule interpreter.

The design of the inference engine 111 is divided into three central components: a rule set, a working memory 201 which contains the current state of the system, and an inference component which applies the rules based on the state of the working memory 201. The inference engine 111 determines how to apply these rules, and also determines the order in which they should be applied.

The particular embodiment of the inference engine depicted was developed using the CLIPS(C Language Integrated Production System) expert system shell. This software development environment contains the basic components of expert systems, and hence eliminates the tedious and time consuming process of programming the basic functions of the software. CLIPS is based on the popular RETE algorithm that provides very efficient rule-based pattern-matching and performance gain increases with size, since it is theoretically independent of the number of rules in the system. The use of the CLIPS expert system shell is preferred in that it is non-commercial, public domain software that does not have any licensing restrictions, is more stable and established than other alternatives, is versatile and portable, and can be embedded with procedural code and called subroutines and integrated with other languages (e.g. database and GUI). It also supports object-oriented (CLIPS Object Oriented Language, COOL) and procedural programming paradigms that facilitate modularity. Moreover, CLIPS also has various extensions (e.g. FuzzyCLIPS, AGENT CLIPS, DYNACLIPS, and wxCLIPS) that are advantageous in supporting fuzzy logic and agents.

Figure 6:
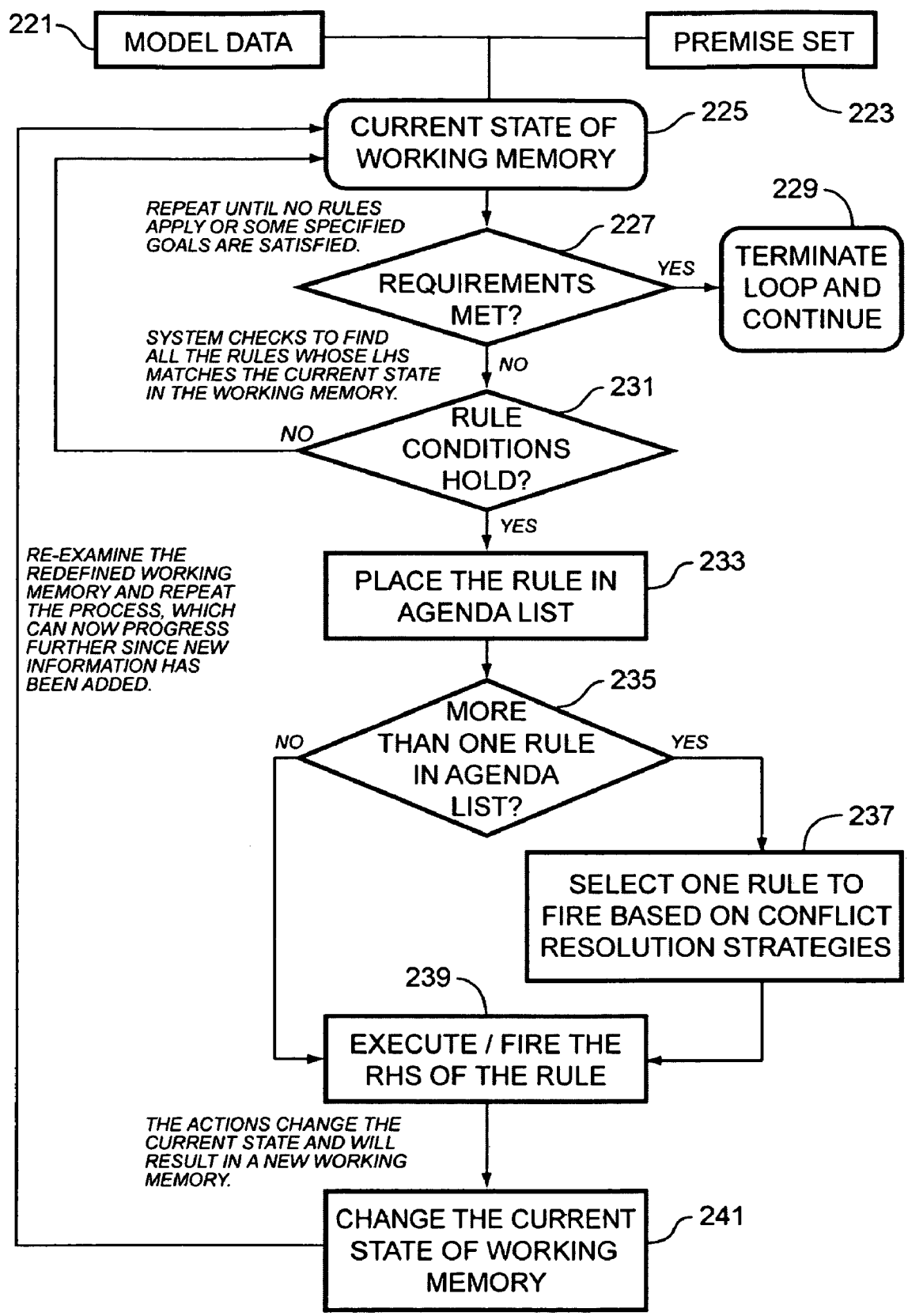
FIG. 6 is a flow chart illustrating the execution cycle of the forward chaining system in the CDOS system disclosed herein.

The logic flow of the inference engine 111 is illustrated in the flow chart of FIG. 6. The input includes the model data 221 generated by the geometry analysis module 113 (see FIG. 1) and the premise set 223 generated by the GUI 109 based on the input casting design specifications 105 (see FIG. 1). The execution cycle of the inference engine 111 is built around a logical "do while" loop that operates on the current state of the working memory 225 of the inference engine 111 to determine if the Boolean variable "requirements met" 227 is false, and repeats itself until the value of this variable is true. When the "requirements met" 227 variable is true, the loop is terminated 229, and the final casting geometry 107 (see FIG. 1) is set or, if no suitable casting geometry was developed, the user is informed of this fact.

The value of the "requirements met" 227 variable is determined by a rule-based algorithm, and is true when the current state of the working memory 225 is such that no rules apply or that some specified goals are satisfied. To deal with conflicts when more than one rule is matched based on the facts asserted, a rule ordering method (which may be, for example, "first in, first serve" or "last in, first serve") may be established as the conflict resolution strategy. This rule ordering method may develop over time. For example, as the development proceeds further and the knowledge database becomes more sophisticated, the concentration may shift to prioritization and specificity methods. Salience of rules or their relative importance with reference to the situation will typically be determined and assigned numerically.

Since the design of the inference engine 111 is based on the rule set, rule templates may be established. Rules may be declared in the form: LHS (Conditions)=>RHS (Actions). The LHS (left hand side) is a collection of conditions that must be matched in the working memory for the rule to be executed, and may be represented in the form (Parameter Name n1 [Value] . . . n ). If the patterns in the LHS are matched, then the actions on the RHS (right hand side) are taken. The actions involve adding and deleting items from the working memory as well as carrying out other operations as necessary. Object oriented programming (COOL) may also be included to enable object inheritance and classes, and design principles and knowledge collected may be represented in the form of these templates.

Referring again to FIG. 6, if the value of the Boolean variable "requirements met" 227 is false, the value of the Boolean variable "rule conditions hold" 231 is then determined. If the value of the Boolean variable "rule conditions hold" 231 is false, then the current state of the working memory 225 is updated to reflect this fact, and the loop is repeated. If the value of the Boolean variable "rule conditions hold" 231 is true, then further processing commences, and the rule is placed in the agenda list 233.

The value of the Boolean variable "more than one rule in agenda list" 235 is then determined. If the value of the Boolean variable "more than one rule in agenda list" 235 is false, then the RHS of the rule is executed 239. If the value of the Boolean variable "more than one rule in agenda list" 235 is true, then a conflict resolution strategy 237 is employed to prioritize the rules, after which the RHS of the rule is executed 239. In either case, execution of the RHS of the rule will change the current state of the working memory 241. When the loop is repeated, the current state of the working memory 225 will be reexamined, and the process will typically be able to proceed further in light of the new information that has been added.

Figure 7:
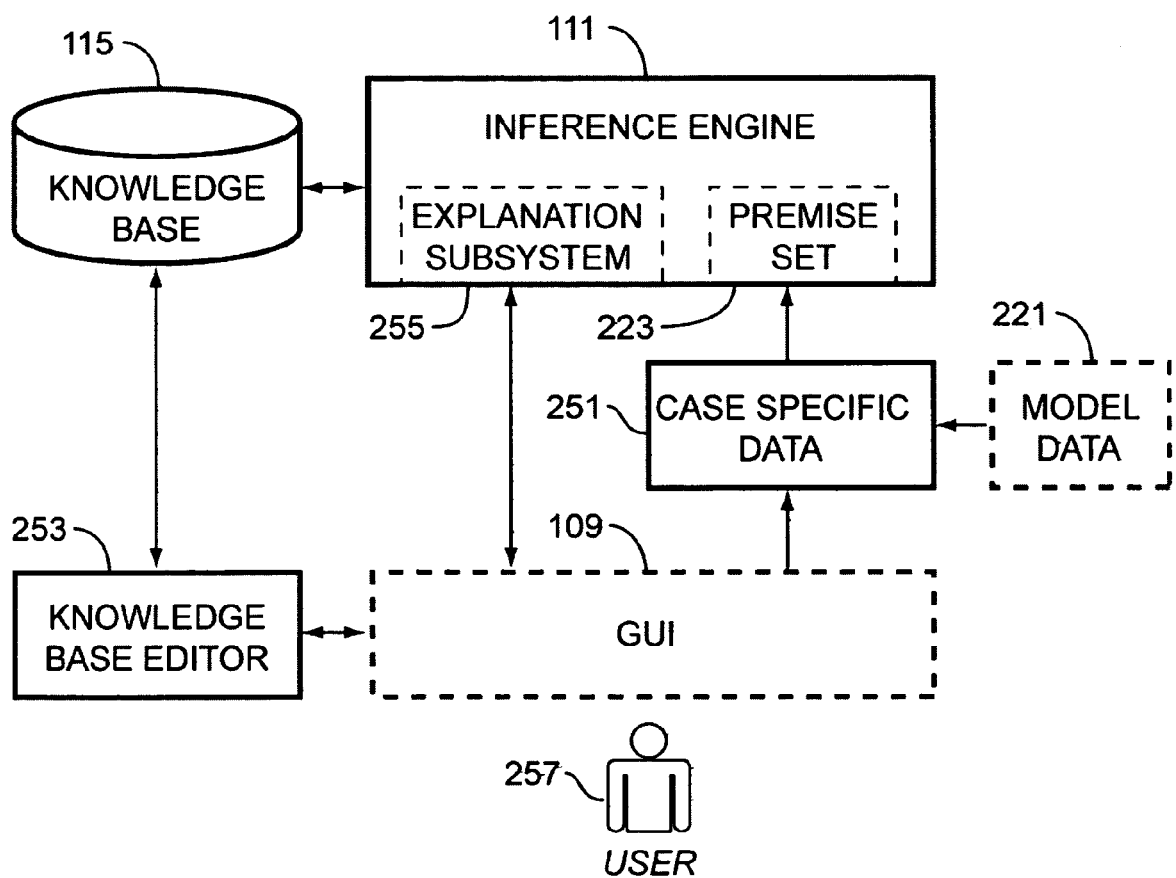
FIG. 7 is a schematic illustration of the connection between the Inference Engine and the Knowledge Database and GUI in the CDOS system disclosed herein.

FIG. 7 illustrates the interaction between the inference engine 111, the knowledge database 115 and the GUI 109. As seen therein, the inference engine 111 contains an explanation subsystem 255 and a premise set 223. The premise set 223 may be formed based in part on case specific data 251 that is unique to the particular product being cast. The case specific data 251 is itself formed in part or in whole based on the model data 221 generated by the geometry analysis module 113 (see FIG. 1). The inference engine 111 cooperates with the knowledge database 115 and the GUI 109. The data in the knowledge database 115 may be modified through the knowledge database editor 253 by way of the GUI 109. The inference engine 111 interfaces with the user 257 by way of the GUI 109.

Inference rules are typically programmed into the inference engine 111, whereas knowledge is typically stored separately in the knowledge database 115. The rules are preferably stored separately in a database as well, since this provides a more systematic and user friendly way to maintain, modify and add new rules. However, an external connection is typically required by the inference engine 111 to access both rules and knowledge. The inference engine is preferably designed with mostly SQL templates instead of rule templates in order to obtain the necessary rules from the database. The connection with the database is determined based on the actual programming platform and on the complexity of the rules. The design of the inference engine 111 is preferably based on the assumption that rules reside within the system itself.

For the explanation subsystem 255, explanation of the conclusion may be established as the explicit trace of the chain of steps underlying the reasoning process. The explanation subsystem 255 saves the path of decision making used by the inference engine 111 in a separate memory in compilation text data format. These detailed trace-based explanations may be useful for system debugging, though they are fairly uninformative for the typical user. Therefore, a more structured explanation facility may be developed to manipulate and present the trace in a more comprehensive or useful form through the user interface. This includes selective, expansive, deductive and hypothetical manipulations.

The knowledge database 115 is preferably divided into two sections, namely, a knowledge section and an inference rules section. The knowledge section includes material properties, design principles and formulas, experiential knowledge, gating and riser components/geometries, and the like. Data is arranged accordingly in specific tables and fields. Relationships/associations are specified for inter-related fields. The inference rules section includes rules and templates for the reasoning process. The templates determine the access/retrieval of selective data from the knowledge section.

Figure 8:
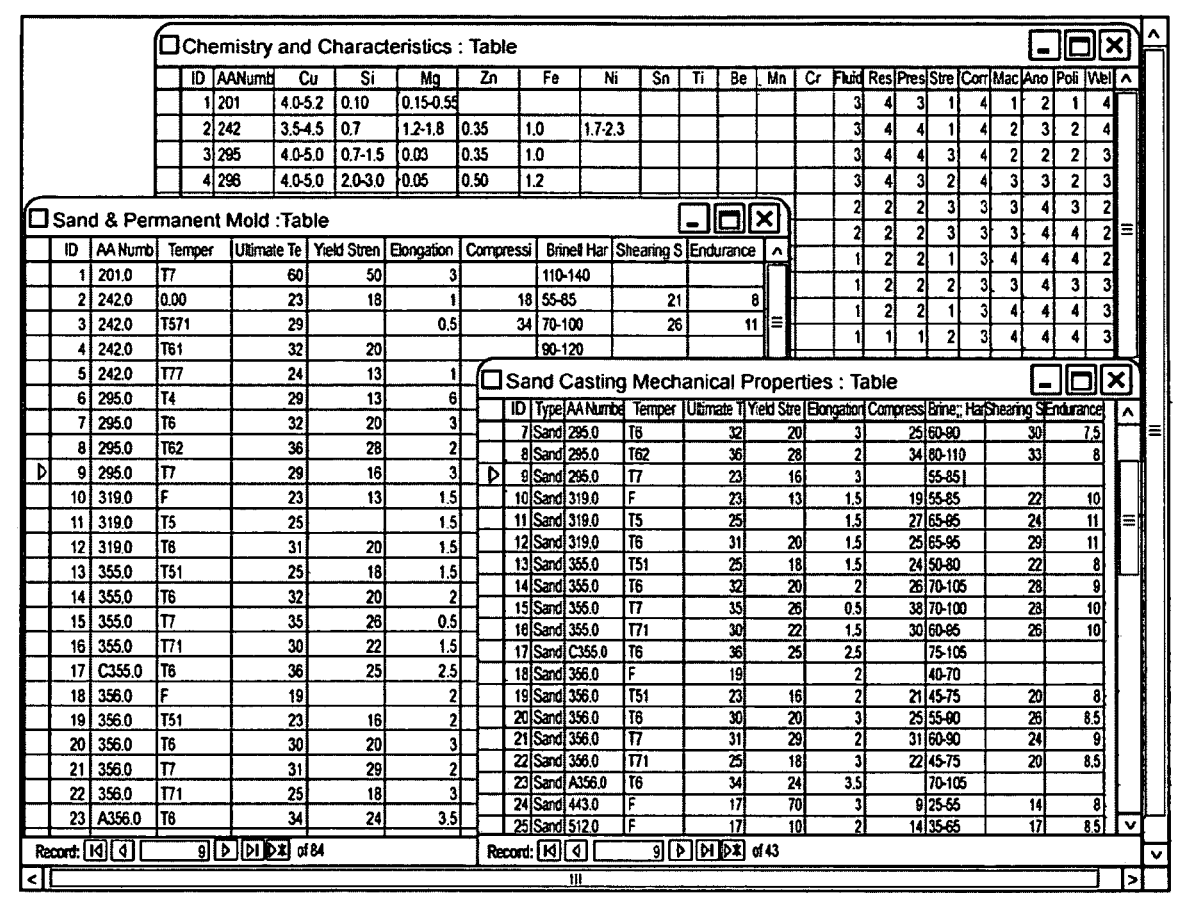

The software program utilized in the pilot programming of the embodiment described above was Microsoft ACCESS®, which was selected based on its ease of use for rapid prototyping. The knowledge section of the database was developed as a GUI 109 to view, to access and to modify data. Examples of screenshots of the GUI 109 are shown in FIGS. 8 and 9.

Classifying data and determining relationships are implemented concurrently with the inference engine 111. Data is methodically organized and the inter-relationships declared. The inter-relationships declared among the collected data are critical towards the formation of rules and rule templates. Rules and rule templates are stored in a separate section of the knowledge database 115. To store 3D components graphically, specific tables are created to store parameters that control their shapes and geometry.

Figure 10:
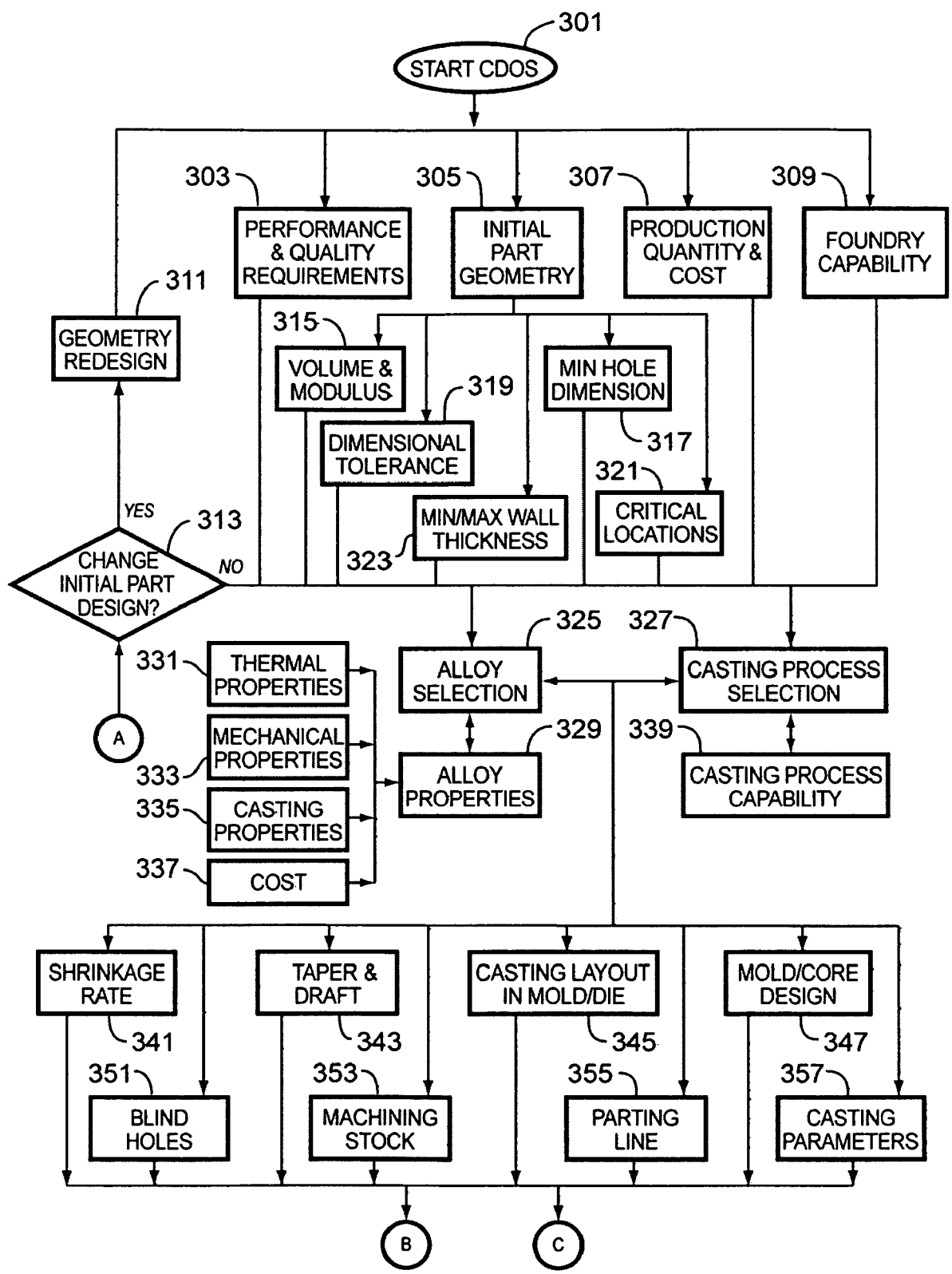
FIGS. 10-11 are schematic illustrations of the logical structure of the CDOS system disclosed herein.
Figure 11:
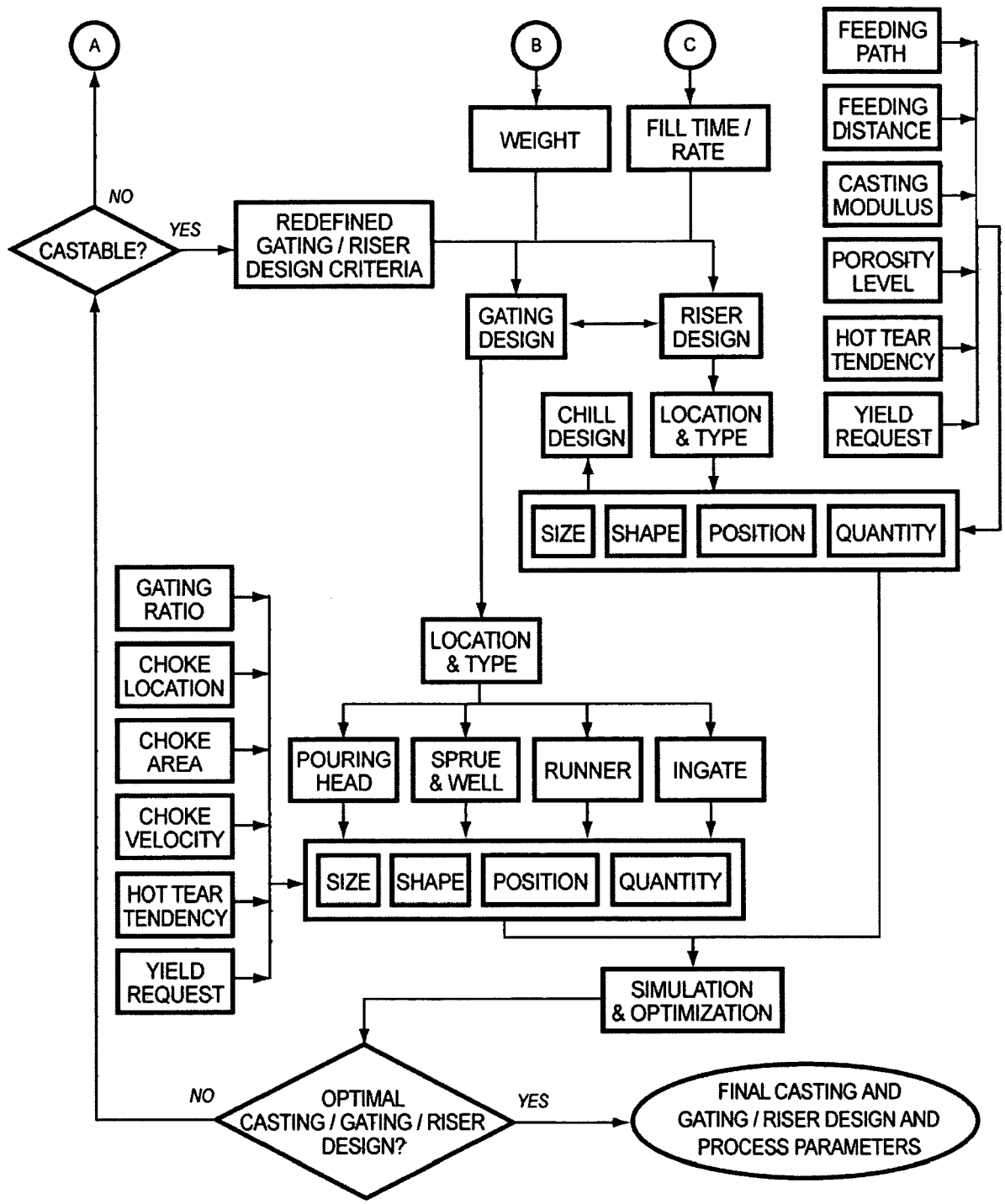

Thus far, several important factors required to facilitate the casting design decision-making process have been identified. A full casting design includes design of castable components, a gating/riser system and casting process parameters. FIGS. 10-11 illustrate the logical structure of the CDOS and show how these various factors are taken into consideration.

Prior to designing a casting process, several factors are usually known, such as the required performance and quality parameters 303, the initial part geometry 305 in electronic graphic format (the three dimensional CAD file), the production quantity and cost 307 of a casting, and foundry capabilities 309. The graphic file input as the initial part geometry 305 typically contains an initial part design which will be used to generate a final casting and gating/riser design and process parameters 399 by the end of the CDOS process. Both the initial part geometry 305 and the working casting design contain volume and modulus information 315, minimum hole dimensions 317, dimensional tolerances 319, critical locations 321, and minimum/maximum wall thicknesses 323.

Based on the foregoing information, an alloy selection 325 and casting process selection 327 may be made. The alloy selection 325 will typically be based on such alloy properties 329 as the thermal properties 331 of the alloy, the mechanical properties 333 of the alloy, the casting properties 335 of the alloy, and the cost 337 of the alloy. The casting process selection 327 takes into account the capabilities 339 of a casting process.

Once the alloy selection 325 and casting process selection 327 are made, various other aspects of the casting process are determined. These may include shrinkage rates 341, the number and location of any blind holes 351, taper and draft 343, machining stock 353, the casting layout in the mold or die 345, the number and location of parting lines 355, the mold/core design 347, and other casting parameters 357. With this information, the casting weight 363 and the die/mold fill time and rate 365 are set.

After the foregoing parameters have been determined, the gating design 367 and riser design 369 are determined. The gating design 367 includes the location and type 383 of pouring head 384, sprue and well 385, runner 386, and ingate 387. Each of these features has size, shape, position and quantity variables 388 associated with it, which are determined in light of the gating ratio 389, choke location 390, choke area 391, choke velocity 392, hot tear tendency 393 and yield request 394. The gating ratio 389 is determined from alloy and casting process selection.

The riser design 369 includes location and type 373 of riser, which has size, shape, position and quantity variables 375 associated with it. Each of these variables are determined in light of such considerations as feeding path 376, feeding distance 377, casting modulus 378, porosity level 379, hot tear tendency 380, and yield request 381.

The casting/gating/riser design is then subjected to simulation and optimization 395, and a determination is made as to whether the resulting design is optimal 397. In the event that the casting/gating/riser design is determined to be optimal, the CDOS system outputs this design and the associated processing parameters 399. If the casting/gating/riser design is determined to not be optimal, a determination 359 is made as to whether the design is castable. If so, the gating/riser design criteria are redefined 361, leading to new gating and/or riser designs, and the new designs are subjected to further simulation and optimization 395. If the casting/gating/riser design is not castable, a determination 313 is made as to whether the initial part design should be changed. If so, the initial part geometry is redesigned 311, and the CDOS process is repeated on the redesigned geometry. If it is determined that the initial part design should not be changed, at least one of the alloy selection 325 and/or the casting process selection 327 are changed, and the CDOS process is repeated utilizing the same initial part design.

Figure 12:
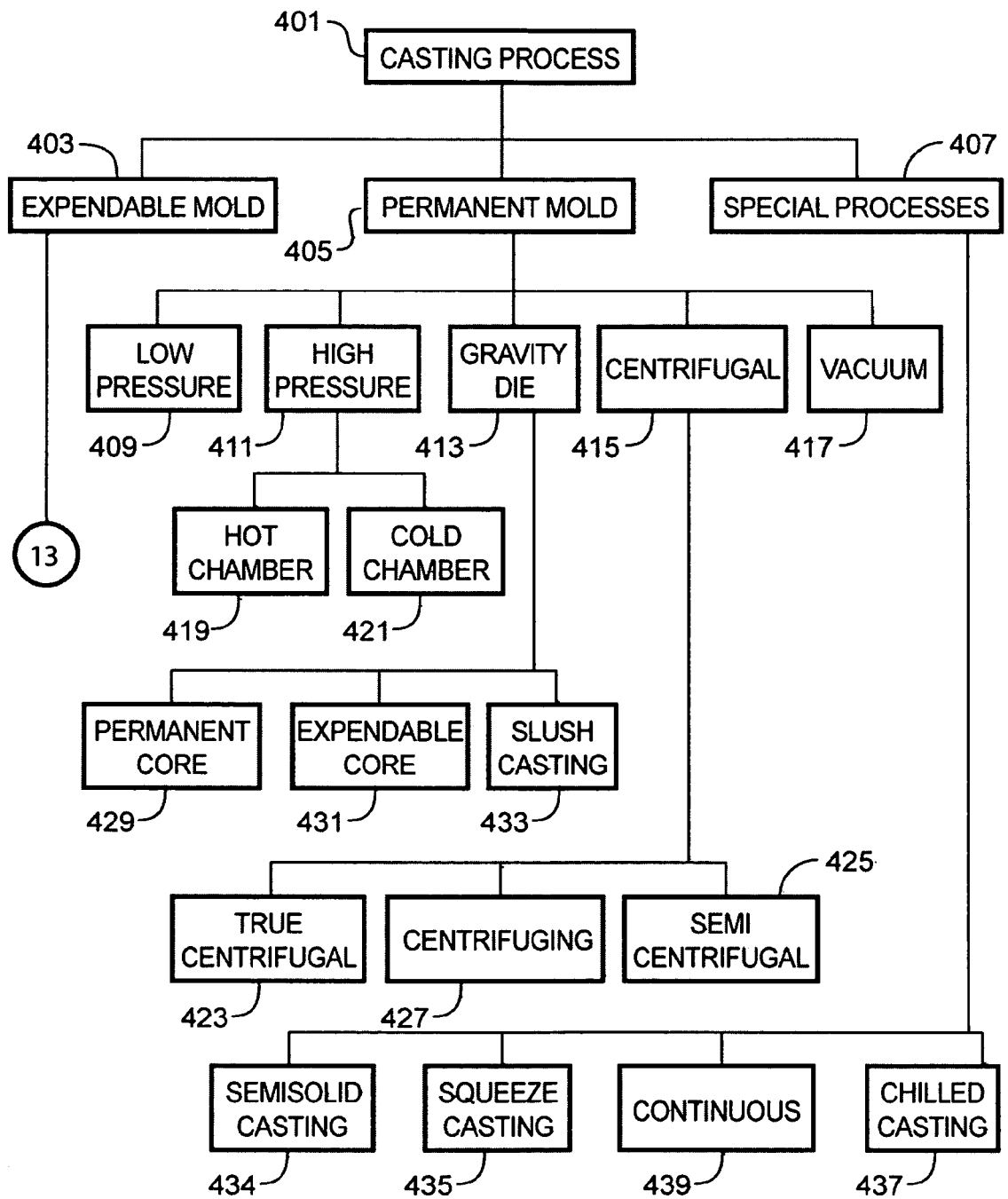
FIGS. 12-13 are schematic illustrations depicting the hierarchical classification of various casting processes included in the CDOS system disclosed herein.
Figure 13:
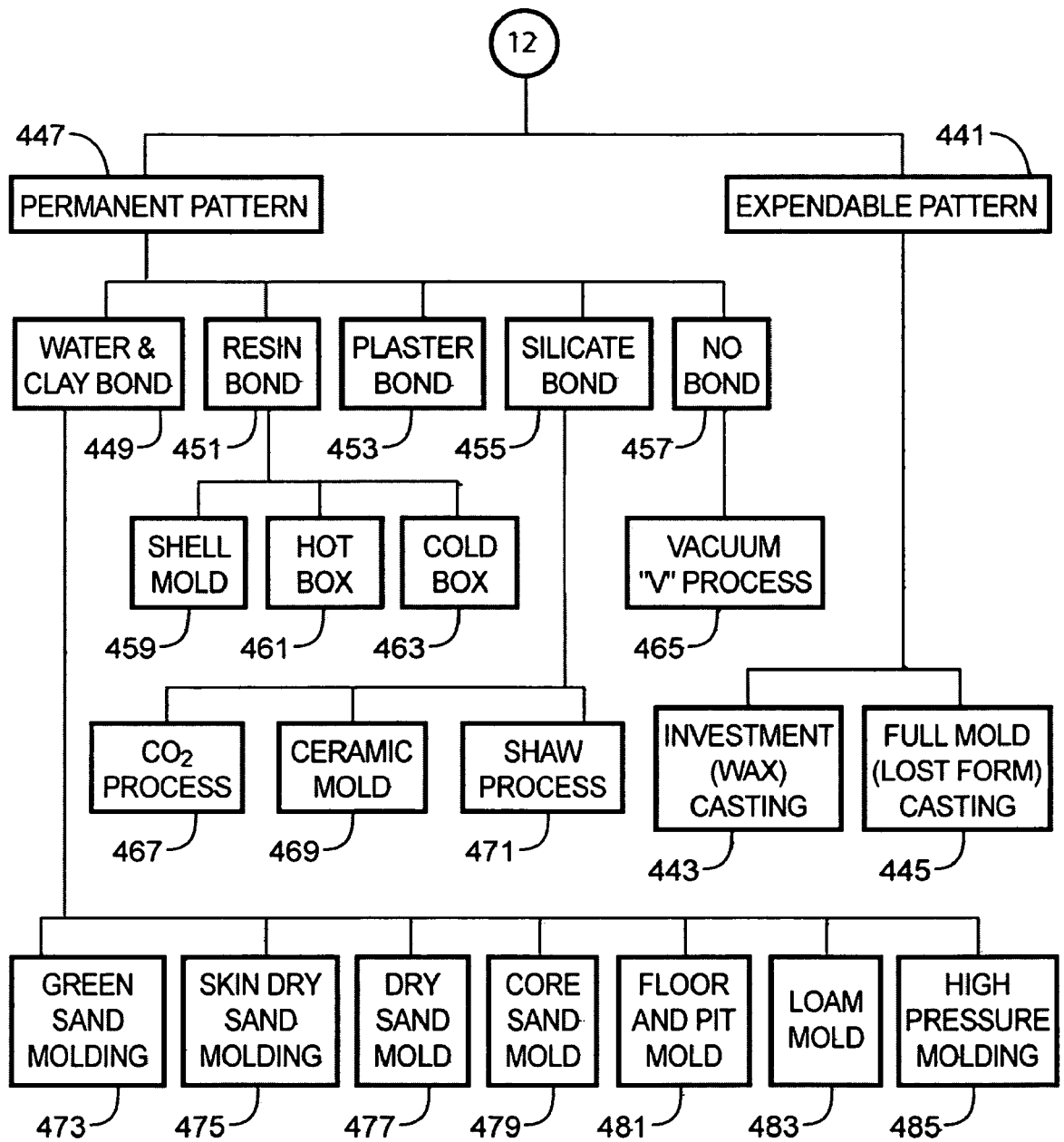

FIGS. 12-13 illustrate the hierarchical classification of various casting processes 401 utilized in the CDOS system described herein. There are many casting processes known to the art, including, for example, sand casting (473-479), investment (or wax) casting 443, gravity die casting 413, pressure die casting 411, centrifugal casting 427, lost form casting 445, vacuum casting 417, and squeeze casting 435. Each casting process is characterized by different capabilities as indicated in TABLE 1. Hence, the various casting processes have associated with them different ranges of geometric features that can be produced (including minimum section thickness and minimum core size), different achievable levels of quality (including surface finish, dimensional tolerance, and internal soundness), and different production parameters (including sample lead time and economic lot size).

TABLE 1

Typical Capabilities of Major Casting Processes

| Casting Process Attribute | Sand | Investment | Gravity Die | Pressure Die |
|---|---|---|---|---|
| Maximum weight | <100 tons | <40 kg | <200 kg | <10 kg |
| Maximum size | <20 m | <0.5 m | <0.8 m | <0.5 m |
| Minimum thickness | >5 mm | >1 mm | >4 mm | >1.5 mm |
| Minimum hole size | >8 mm | >4 mm | >6 mm | >2 mm |
| Dimensional tolerance | >0.6 mm | >0.1 mm | >0.4 mm | >0.05 mm |
| Surface roughness | >12 μm | >4 μm | >6 μm | >2 μm |
| Economic quantity | any number | >100 | >1000 | >10 000 |
| Prototype lead time | >4 weeks | >8 weeks | >8 weeks | >12 weeks |

To select a feasible casting process, part requirements or attributes (wall thickness, surface finish, order quantity, and the like) must be compared with the corresponding capabilities of the process. The process that satisfies all the requirements of the part is considered a feasible process.

The various casting processes 401 may be divided into expendable mold processes 403, permanent mold processes 405, and special processes 407. Special processes 407 include squeeze casting 435, chilled casting 437, continuous casting 439, and semi-solid casting 434.

Permanent mold processes 405 include low pressure processes 409, high pressure processes 411, gravity die processes 413, centrifugal processes 415 and vacuum processes 417. High pressure processes include hot chamber 419 and cold chamber 421 processes. Gravity die processes include permanent core 429, expendable core 431 and slush casting 433 processes. Centrifugal processes 415 include true centrifugal processes 423, semi-centrifugal processes 425, and centrifuging processes 427.

Expendable mold processes 403 may be further divided into permanent pattern processes 447 and expendable pattern processes 441. Expendable pattern processes 441 include investment (wax) casting 443 and full mold (lost form) casting 445.

Permanent pattern processes 447 include water and clay bond 449, resin bond 451, plaster bond 453, silicate bond 455 and no bond 457 processes. No bond 457 processes include vacuum "V" processes 465. Silicate bond processes 455 include $CO_2$ processes 467, ceramic mold processes 469, and Shaw processes 471. Resin bond processes 451 include shell mold 459, hot box 461 and cold box 463 processes. Water and clay bond processes 449 include green sand molding 473, skin dry sand molding 475, dry sand molding 477, core sand molding 479, floor and pit molding 481, loam molding 483 and high pressure molding 485.

The considerations that go into selecting a casting process may be illustrated with reference to the type of gating system employed in the part to be cast. According to the orientation of the parting plane, a gating system can be classified as a horizontal or vertical gating system. Horizontal gating systems are those in which parting plane is horizontal and contains the runners and ingate, and in which the sprue is vertical and perpendicular to the parting plane. Parts containing horizontal gating systems are suitable for flat castings filled under gravity, such as green sand casting 473 and gravity die casting 413. Vertical gating systems are those in which the parting plane is vertical and contains the runners and ingates. For gravity fill processes (sand mold 473-479, shell mold 459 and gravity die casting 413) the sprue is vertical, that is, along the parting plane. Such processes are suitable for tall castings.

For pressure die casting 411, the sprue may be horizontal, that is, perpendicular to the parting plane.

Depending on the position of the ingate, gating systems can be classified as top, parting and bottom. Top gating systems, in which hot molten metal enters at the top of the casting, promote directional solidification from bottom to top of the casting. Top gating systems are, however, suitable only for flat castings in order to limit the damage to both the metal and the mold by free-falling molten metal during initial filling. Bottom gating systems have the opposite characteristics: the metal enters at the bottom of the casting and gradually fills up the mould with minimal disturbances. It is recommended for tall castings, where the free-fall of molten metal (from top or parting gates) must be avoided. Middle or side or parting gating systems combine the characteristics of top and bottom gating systems. If the gating channels are at the parting plane, they are also easier to produce and modify, if necessary, during trial runs. The most widely used systems are horizontal gating systems with ingates at the parting plane. In vertical gating systems, ingates may be positioned at the top, bottom and side of the mold.

In the design optimization process described herein, the inference engine first defines the window (domain) of the selected casting and gating/riser design from the known database for optimization. With the aid of computer process modeling (including mold filling, solidification, stress analysis, etc.) and optimization techniques, the system further optimizes the casting and gating design. Examples of objective functions used for the design optimization include minimized casting defects (e.g., volume % porosity and oxides), minimized cost, maximized yield, and maximized productivity:

$Obj1=w_1*Min\ vol\ \%\ Porosity+w_2*Min\ Oxides\ w_3*Min\ Cost$ $Obj2=w_4*Max\ Yield+w_5*Max\ Productivity$ $Obj=w_6*Obj1+w_7*1/Obj2$ The following constrains are examples of constraints considered during the design optimization process:

Yield>$y_0$

Volume % porosity<$v_0$

Cycle time<=$t_0$

Existing casting facility constraints

The CDOS systems and associated methodologies disclosed herein have been described with respect to their application in metal casting processes, and are particularly suitable for aluminum alloy casting processes. It will be appreciated, however, that the systems and methodologies are not limited to metal casting, but may be employed in other applications where similar considerations arise. For example, the systems and methodologies described herein may be applied, with suitable modification, to casting and molding articles from polymeric materials, including, but not limited to, thermoplastics.

Casting Design Optimization Systems (CDOS) and methodologies have been provided herein which allow casting designers and casting process engineers to optimize the design of casting geometries and gating/riser systems, as well as casting procedures and parameters, to ensure high quality castings with minimum lead time and cost. These systems and methodologies reduce scrap, increase yield, and improve the mechanical properties and durability of cast components, thus resulting in significant energy and cost savings and an increased use of shape castings in critical structural applications that require high strength and fatigue resistance. Moreover, since these systems and methodologies allow the design of the gating/riser system to be optimized along with the remainder of the casting design, the process described herein results in optimization of the total casting design.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A casting design system (101), comprising:
   a database (115) which contains casting design data and rules pertaining to alloy properties, casting processes, geometrics, mined data and design rules;
   a user interface (109), in communication with said database (115), which accepts as input a product design (103) that is to be cast by a casting process;
   an inference engine (111) which is adapted to generate casting designs (114) from the input product design (103) by searching the database (115) and retrieving data therefrom, and by considering the influence of a casting method on a casting solution; and
   a process simulation module (110) which performs process simulations on casting designs (114) generated by the inference engine (111).

2. The system of claim 1, further comprising:
   an optimization module (117) that optimizes the casting designs (114).

3. The system of claim 2, wherein the optimization module (117) optimizes the casting process design by analyzing data generated by the process simulation module (110) on the design and, if the data generated indicates that the design is not optimal, performing the steps of:
   modifying the casting design; and
   inputting the modified casting design to the process simulation module (110).

4. The system of claim 1, wherein the casting process involves casting the product covered by the product design from a metal.

5. The system of claim 4, wherein the metal is selected from the group consisting of aluminum and its alloys.

6. The system of claim 1, wherein the user interface further accepts casting design specifications (105) as an input.

7. The system of claim 1, further comprising:
   a geometry analysis module (113), in communication with said user interface (109), which analyzes the input product design (103) and generates the geometry characteristics of the product to be cast.

8. The system of claim 7, wherein the inference engine (111) is in communication with said database (115), said geometry analysis module (113), and said user interface (109).

9. The system of claim 1, wherein said process simulation module (110) is in communication with said inference engine (111) and said user interface (109).

10. The system of claim 1, wherein the casting design data and rules include data and rules pertaining to the gating and riser.

11. The system of claim 1, wherein the casting design data and rules include data and rules pertaining to metal alloys.

12. The system of claim 1, wherein the optimization module (117) optimizes the casting design based on simulation results.

13. The system of claim 1, wherein the optimization module (117) optimizes the casting design based on objective functions and casting design constraints.

14. The system of claim 1, wherein said inference engine (111) is further adapted to generate casting designs by implementing logical processes.

15. The system of claim 1, wherein said inference engine (111) is further adapted to generate casting designs by performing pattern-matching operations between data contained in the database (115) and search parameters.

16. The system of claim 1, wherein the casting design includes casting procedures.

17. The system of claim 1, wherein the casting design includes gating and riser designs.

18. The system of claim 1, wherein the casting design includes an alloy selection.

19. The system of claim 1, wherein the casting design includes a casting process selection.

20. A method for analyzing a casting design, comprising:
   providing a proposed casting design (103) for optimization;
   providing a database (115) which contains information relating to casting, the database including design rules, alloy properties, mined data, geometrics, and information relating to known casting methods;
   analyzing the geometry (113) of the proposed casting design (103) with the use of the information contained in the database (115), thereby deriving a possible casting solution; and
   designing and running a process simulation (110) on the possible casting solution.

21. The method of claim 20, further comprising the step of:
   optimizing (117) the casting design.

22. The method of claim 21 wherein, if the proposed casting design is not optimal but the proposed casting design geometry is castable, then at least one element selected from the group consisting of the gating design, riser design, alloy selection, and casting process is redefined for further process simulation and optimization.

23. The method of claim 20, wherein the database (115) contains other casting solutions.

24. The method of claim 20, wherein the casting design includes casting procedures.

25. The method of claim 20, wherein the casting design includes gating and riser designs.

26. The method of claim 20, wherein the casting design includes alloy selection.

27. A computer program, disposed in a tangible medium, and containing suitable instructions for implementing the method of claim 20.

28. A casting design optimization system, comprising:
   a knowledge database (115) which contains casting design data and rules pertaining to alloy properties, casting processes, geometries, mined data and design rules;
   a graphical user interface (109), in communication with said knowledge database (115), which accepts as input a product design (103) for a product that is to be cast by a casting process;
   a geometry analysis module (113), in communication with said graphical user interface (109), which analyzes the input product design (103) and generates the geometry characteristics of the product to be cast;
   an inference engine (111) which is adapted to generate casting designs by (a) searching the knowledge database (115), (b) performing pattern-matching operations, and (c) implementing logical processes;
   a process simulation module (110) which designs and runs process simulations on the casting designs generated by the inference engine (111); and
   an optimization module (117) that optimizes the casting designs generated by the inference engine (111).

\* \* \* \* \*